(12) United States Patent
Chen et al.

(10) Patent No.: US 11,074,018 B2
(45) Date of Patent: Jul. 27, 2021

(54) NETWORK ASSET MANAGEMENT

(71) Applicant: International Business Machines Corporation, Armonk, NY (US)

(72) Inventors: Duo Chen, Shanghai (CN); Min Fang, Shanghai (CN); Da Liu, Shanghai (CN); Jinyi Pu, Shanghai (CN); Jiang Yu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 15/480,865

(22) Filed: Apr. 6, 2017

(65) Prior Publication Data

US 2018/0293004 A1   Oct. 11, 2018

(51) Int. Cl.
*G06F 3/06* (2006.01)

(52) U.S. Cl.
CPC ............ *G06F 3/0685* (2013.01); *G06F 3/061* (2013.01); *G06F 3/065* (2013.01); *G06F 3/067* (2013.01); *G06F 3/0647* (2013.01)

(58) Field of Classification Search
CPC ...... G06F 3/0685; G06F 3/0647; G06F 6/061; G06F 9/5083; G06F 3/067; G06F 3/065
See application file for complete search history.

(56) References Cited

U.S. PATENT DOCUMENTS

| | | | | |
|---|---|---|---|---|
| 6,237,086 B1* | 5/2001 | Koppala | ............ | G06F 9/30149 712/202 |
| 6,289,413 B1* | 9/2001 | Rogers | ................ | G06F 12/0893 711/105 |
| 7,693,877 B1* | 4/2010 | Zasman | ................ | G06F 16/185 707/707 |
| 7,818,489 B2* | 10/2010 | Karamcheti | ............ | G06F 12/08 711/101 |
| 7,913,055 B2* | 3/2011 | Karamcheti | ........ | G06F 12/0207 711/203 |
| 7,930,513 B2* | 4/2011 | Karamcheti | ............ | G06F 3/068 711/203 |
| 8,068,360 B2* | 11/2011 | Anholt | ................ | G11C 11/5642 365/185.02 |
| 8,156,302 B2* | 4/2012 | Karamcheti | ........ | G06F 12/0207 711/170 |
| 8,205,061 B2* | 6/2012 | Karamcheti | ............ | G06F 3/068 711/170 |

(Continued)

OTHER PUBLICATIONS

Micron, "Technical Note: Wear-Leveling Techniques in NAND Flash Devices", 2008, pp. 1-8, https://www.micron.com/-/media/client/global/documents/products/technical-note/nand-flash/tn2942_nand_wear_leveling.pdf (Year: 2008).*

*Primary Examiner* — Christopher D Birkhimer
(74) *Attorney, Agent, or Firm* — Kunzler Bean & Adamson (57) ABSTRACT

Embodiments include a load calculator, a workload analyzer, and a decision module. The load calculator generates an input/output (IO) record for an asset. The IO record includes a count of read operations and write operations corresponding to the asset from each of a plurality of sites. The workload analyzer collects the IO record and generates at least one of a write threshold and a read threshold. The decision module generates a request for at least one of a promotion and a copy of the asset in response to a determination that an operation has reached at least one of the write threshold and the read threshold for the asset.

20 Claims, 8 Drawing Sheets

(56) References Cited

U.S. PATENT DOCUMENTS

| | | | | |
|---|---|---|---|---|
| 8,230,123 B2* | 7/2012 | Chiu | G06F 3/0605 | 710/8 |
| 8,239,543 B1* | 8/2012 | Ramany | G06F 3/0604 | 709/227 |
| 8,266,407 B2* | 9/2012 | Karamcheti | G06F 12/0207 | 711/203 |
| 8,555,024 B2* | 10/2013 | Karamcheti | G06F 3/0647 | 711/170 |
| 8,606,997 B2* | 12/2013 | Cypher | G06F 12/0811 | 711/117 |
| 8,639,910 B2* | 1/2014 | Karamcheti | G06F 12/10 | 711/203 |
| 8,730,721 B2* | 5/2014 | Camp | G11C 16/3418 | 365/185.02 |
| 8,782,373 B2* | 7/2014 | Karamcheti | G06F 9/5016 | 711/203 |
| 8,874,835 B1* | 10/2014 | Davis | G06F 3/0679 | 711/103 |
| 8,943,263 B2* | 1/2015 | Frost | G06F 12/0246 | 711/103 |
| 9,047,087 B2* | 6/2015 | Antony | G06F 11/3442 | |
| 9,055,044 B2* | 6/2015 | Takagi | H04L 67/06 | |
| 9,122,613 B2* | 9/2015 | Lacourba | G06F 12/0862 | |
| 9,177,670 B1* | 11/2015 | Derbeko | G11C 16/16 | |
| 9,189,344 B2* | 11/2015 | Kono | G06F 11/1448 | |
| 9,215,476 B2* | 12/2015 | Gladwin | G06F 11/1092 | |
| 9,218,183 B2* | 12/2015 | Kishore | G06F 9/30032 | |
| 9,223,719 B2* | 12/2015 | Karamcheti | G06F 13/1657 | |
| 9,229,638 B1* | 1/2016 | Bora | G06F 3/0653 | |
| 9,244,617 B2* | 1/2016 | Bux | G06F 12/0646 | |
| 9,244,618 B1 | 1/2016 | Martin et al. | | |
| 9,250,991 B2* | 2/2016 | Frost | G06F 12/0246 | |
| 9,262,315 B2* | 2/2016 | Meir | G06F 12/0246 | |
| 9,262,334 B2* | 2/2016 | Karamcheti | G06F 13/1657 | |
| 9,285,994 B2 | 3/2016 | Bish et al. | | |
| 9,292,451 B2* | 3/2016 | Dong | G06F 12/0891 | |
| 9,298,606 B2* | 3/2016 | Ramanujan | G11C 16/06 | |
| 9,335,948 B1* | 5/2016 | Kirac | G06F 3/0649 | |
| 9,395,936 B2* | 7/2016 | Sakata | G06F 3/065 | |
| 9,419,655 B2* | 8/2016 | Cai | G06F 11/1004 | |
| 9,430,149 B2* | 8/2016 | Slik | G06F 3/0611 | |
| 9,430,152 B2* | 8/2016 | Slik | G06F 3/0608 | |
| 9,471,450 B2* | 10/2016 | Best | G06F 11/2094 | |
| 9,501,235 B2* | 11/2016 | Frost | G06F 12/0246 | |
| 9,557,938 B2* | 1/2017 | Slik | G06F 3/0652 | |
| 9,563,377 B2* | 2/2017 | Takagi | H04L 67/06 | |
| 9,588,686 B2* | 3/2017 | Baptist | H04L 67/1097 | |
| 9,594,507 B2* | 3/2017 | Gladwin | H04L 67/1097 | |
| 9,612,953 B1* | 4/2017 | Davis | G06F 3/0653 | |
| 9,971,548 B1* | 5/2018 | Talwar | G06F 3/0613 | |
| 2004/0073831 A1* | 4/2004 | Yanai | G06F 3/0689 | 714/6.32 |
| 2008/0082596 A1* | 4/2008 | Gorobets | G06F 12/0253 | |
| 2008/0109592 A1* | 5/2008 | Karamcheti | G06F 3/0647 | 711/103 |
| 2008/0109593 A1* | 5/2008 | Karamcheti | G06F 12/1009 | 711/103 |
| 2008/0177978 A1* | 7/2008 | Karamcheti | G06F 12/0207 | 711/206 |
| 2010/0161904 A1* | 6/2010 | Cypher | G06F 12/0811 | 711/122 |
| 2011/0022788 A1* | 1/2011 | Karamcheti | G06F 12/0207 | 711/103 |
| 2011/0167205 A1* | 7/2011 | Karamcheti | G06F 9/5016 | 711/103 |
| 2011/0173371 A1* | 7/2011 | Karamcheti | G06F 3/0647 | 711/6 |
| 2012/0198141 A1* | 8/2012 | Karamcheti | G06F 3/0647 | 711/103 |
| 2012/0233391 A1* | 9/2012 | Frost | G06F 12/0246 | 711/103 |
| 2012/0260030 A1* | 10/2012 | Karamcheti | G06F 3/0647 | 711/103 |
| 2013/0007338 A1* | 1/2013 | Karamcheti | G06F 3/068 | 711/6 |
| 2013/0080725 A1* | 3/2013 | Usui | G06F 3/061 | 711/162 |
| 2013/0198468 A1* | 8/2013 | Antony | G06F 11/3442 | 711/162 |
| 2014/0095775 A1* | 4/2014 | Talagala | G06F 12/0866 | 711/103 |
| 2014/0173017 A1* | 6/2014 | Takagi | H04L 67/06 | 709/213 |
| 2014/0258622 A1* | 9/2014 | Lacourba | G06F 12/0862 | 711/122 |
| 2014/0258653 A1* | 9/2014 | Karamcheti | G06F 3/0685 | 711/159 |
| 2014/0301140 A1* | 10/2014 | Camp | G11C 16/3418 | 365/185.02 |
| 2015/0012721 A1* | 1/2015 | Karamcheti | G06F 9/5016 | 711/203 |
| 2015/0067284 A1* | 3/2015 | Antony | G06F 3/065 | 711/162 |
| 2015/0100662 A1* | 4/2015 | Kaczmarek | H04L 67/1097 | 709/213 |
| 2015/0100697 A1* | 4/2015 | Baptist | H04L 67/1097 | 709/226 |
| 2015/0100726 A1* | 4/2015 | Gladwin | H04L 67/1097 | 711/114 |
| 2015/0100727 A1* | 4/2015 | Baptist | H04L 67/1097 | 711/114 |
| 2015/0100846 A1* | 4/2015 | Gladwin | H04L 67/1097 | 714/763 |
| 2015/0100966 A1* | 4/2015 | Baptist | H04L 67/1097 | 718/103 |
| 2015/0101024 A1* | 4/2015 | Leggette | H04L 67/1097 | 726/4 |
| 2015/0113341 A1* | 4/2015 | Frost | G06F 12/0246 | 714/704 |
| 2015/0186223 A1* | 7/2015 | Kono | G06F 11/1448 | 711/162 |
| 2015/0199268 A1* | 7/2015 | Davis | G06F 12/0246 | 711/103 |
| 2015/0286439 A1* | 10/2015 | Takagi | H04L 67/06 | 711/162 |
| 2015/0286528 A1* | 10/2015 | Cai | G06F 11/1004 | 714/763 |
| 2015/0324120 A1* | 11/2015 | Wu | G06F 3/065 | 711/103 |
| 2015/0331610 A1* | 11/2015 | Slik | G06F 3/0608 | 711/166 |
| 2015/0331617 A1* | 11/2015 | Slik | G06F 3/0611 | 711/169 |
| 2015/0331621 A1* | 11/2015 | Slik | G06F 3/0652 | 711/114 |
| 2015/0347038 A1* | 12/2015 | Monteleone | G06F 3/0616 | 711/103 |
| 2016/0019210 A1* | 1/2016 | O'Brian | G06F 16/955 | 707/747 |
| 2016/0098206 A1* | 4/2016 | Kishore | G06F 9/30032 | 711/162 |
| 2016/0103744 A1* | 4/2016 | Antony | G06F 3/065 | 714/4.12 |
| 2016/0117258 A1* | 4/2016 | Karamcheti | G06F 13/1657 | 711/168 |
| 2016/0162211 A1* | 6/2016 | Frost | G06F 12/0246 | 711/103 |
| 2016/0216903 A1* | 7/2016 | Joshi | G06F 3/0619 | |
| 2016/0216904 A1* | 7/2016 | Joshi | G06F 3/0619 | |
| 2016/0224244 A1* | 8/2016 | Gensler, Jr. | G06F 3/0604 | |
| 2016/0224278 A1* | 8/2016 | Gensler, Jr. | G06F 3/0659 | |
| 2016/0315635 A1* | 10/2016 | Cai | G06F 11/1004 | |
| 2017/0041394 A1* | 2/2017 | Mortazavi | H04L 67/1097 | |
| 2017/0060675 A1* | 3/2017 | Alnafoosi | H04L 67/10 | |

* cited by examiner

| Host Name | Read Counts | Write Counts | Local/Remote |
|---|---|---|---|
| A | 30 | 0 | Local |
| B | 200 | 10 | Remote |
| C | 150 | 15 | Remote |

| Host Name | Read Counts | Write Counts | Local/Remote |
|---|---|---|---|
| A | 20 | 100 | Local |
| B | 0 | 0 | Remote |
| C | 0 | 110 | Remote |

NETWORK ASSET MANAGEMENT

FIELD

The subject matter disclosed herein relates to network storage and more particularly relates to asset management in network storage.

BACKGROUND

An abundance of data is created and used individually and by groups such as companies and businesses. Server-based storage networks are one solution to providing flexible and efficient storage for a wide variety of applications. One such storage network is a server storage area network (or server SAN). A server SAN is a network which can incorporate one or more commodity servers with storage devices such as hard disks, tapes, solid-state drives, etc. attached to the servers. A server SAN may include software to allow a remote server, user terminal, or other device to access the server's devices through an operating system (OS) which can present the devices as if they were locally attached storage devices even if they are remote to the accessing device. Server SANs can be further incorporated with other storage systems and access systems to provide additional features and functionality.

BRIEF SUMMARY

A network asset management system is disclosed. The system includes a load calculator, a workload analyzer, and a decision module. The load calculator generates an input/output (IO) record for an asset. The IO record includes a count of read operations and write operations corresponding to the asset from each of a plurality of sites. The workload analyzer collects the IO record and generates at least one of a write threshold and a read threshold. The decision module generates a request for at least one of a promotion and a copy of the asset in response to a determination that an operation has reached at least one of the write threshold and the read threshold for the asset.

A method is also disclosed. The method includes tracking a number of read operations for an asset independently from a number of write operations for the asset. The read operations and write operations for the asset originate from each of a plurality of sites. The method also includes generating a request in response to a determination that at least one of the number of read operations and the number of write operations tracked for the asset from at least one of the plurality of servers exceeds a corresponding threshold. The method also includes executing the request on the asset.

A computer program product for providing network asset management is also disclosed. The computer program product includes a computer readable storage medium having program instructions embodied therewith. The program instructions readable/executable by a processor to cause the processor to track a number of read operations for an asset independently from a number of write operations for the asset. The read operations and write operations for the asset originate from each of a plurality of sites. The program instructions readable/executable by the processor are further to generate a request in response to a determination that at least one of the number of read operations and the number of write operations tracked for the asset from at least one of the plurality of servers exceeds a corresponding threshold. The program instructions readable/executable by the processor are further to execute the request on the asset.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer or other programmable apparatus or device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server, and proxy computers via loading a computer readable storage medium such as a CD, DVD, etc., the computer program product may be automatically or semi-automatically deployed into a computer system by sending the computer program product to a central server or a group of central servers. The computer program product is then downloaded into the client computers that will execute the computer program product. Alternatively, the computer program product is sent directly to the client system via e-mail. The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

The computer program product, in one embodiment, may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally, the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions which identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server, and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

The computer program product, in one embodiment, may be deployed, accessed, and executed using a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the computer program product (i.e. the software resides elsewhere) wherein the lifetime of the VPN is limited to a given period of time or a given number of deployments based on an amount paid.

The computer program product may be deployed, accessed, and executed through either a remote-access or a site-to-site VPN. When using the remote-access VPNs the computer program product is deployed, accessed, and executed via the secure, encrypted connections between a company's private network and remote users through a third-party service provider. The enterprise service provider (ESP) sets up a network access server (NAS) and provides the remote users with desktop client software for their computers. The telecommuters can then dial a toll-free number or attach directly via a cable or DSL modem to reach the NAS and use their VPN client software to access the corporate network and to access, download and execute the computer program product.

When using the site-to-site VPN, the computer program product is deployed, accessed, and executed through the use of dedicated equipment and large-scale encryption that are used to connect a company's multiple fixed sites over a public network such as the Internet.

The computer program product is transported over the VPN via tunneling which is the process of placing an entire packet within another packet and sending it over a network. The protocol of the outer packet is understood by the network and both points, called tunnel interfaces, where the packet enters and exits the network.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

Figure 1:
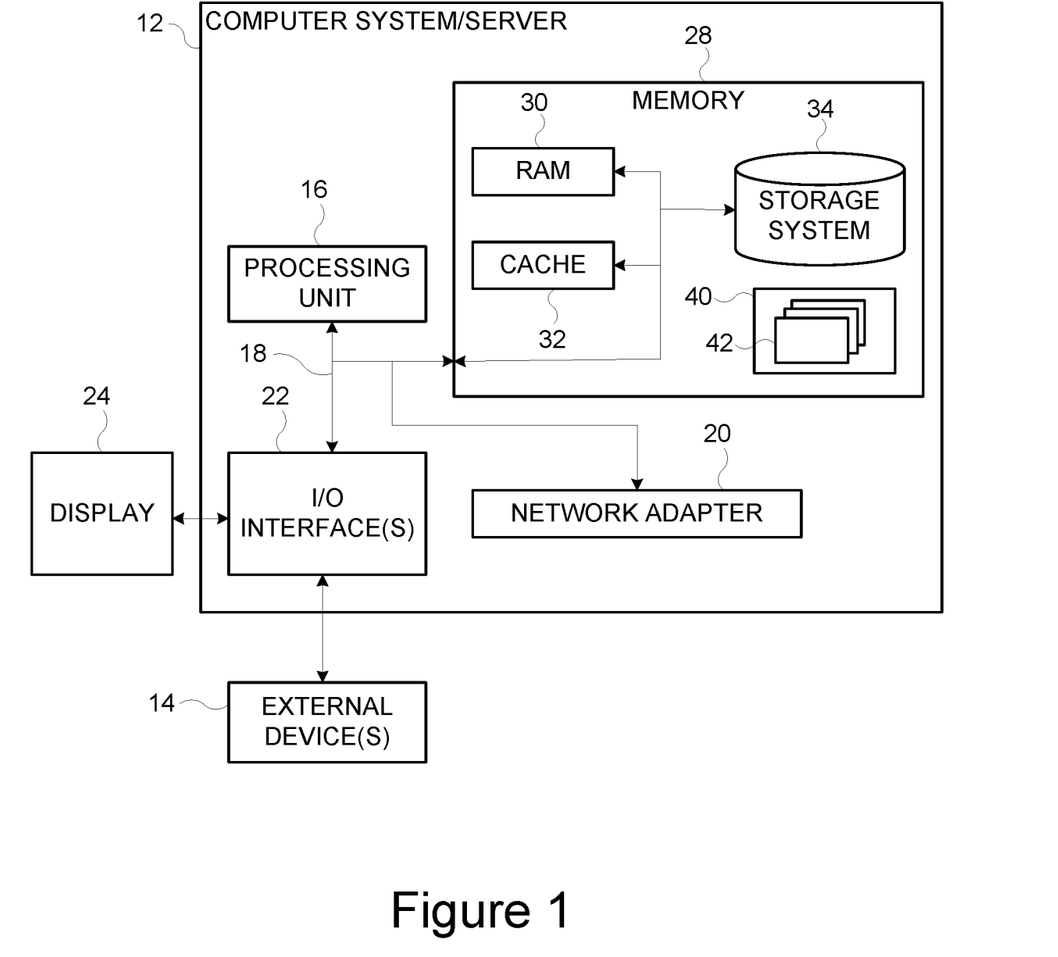
FIG. 1 is a schematic diagram illustrating one embodiment of a computer system which is applicable to implement the embodiments of the present invention.

FIG. 1 shows an exemplary computer system/server 12 which is applicable to implement the embodiments of the present disclosure. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a storage media (not shown and typically called a "drive").

Although not shown, a magnetic disk drive for reading from and writing to a removable, non-volatile solid state drive, magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data, or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22.

Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. While not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In one embodiment, the computer system/server 12 is part of or is in communication with a network such as a server storage area network (server SAN). Communication with other devices, apparatuses, or systems on the network may be handled by the I/O interfaces 22 or the network adapter 20. In some embodiments, the computer system/server 12 includes various modules, described in greater detail below, to manage one or more assets stored on the network. In some embodiments, the computer system/server 12 requests to read or write to an asset stored on the server SAN. In other embodiments, the computer system/server 12 independently or in conjunction with other systems or devices, tracks operations on a stored asset, creates thresholds for operations corresponding to the asset, generates requests for management of the asset, analyzes requests for the asset, and/or executes requests to manage the asset on the network. Fewer or more than these functions and other functions may be accomplished wholly or in part by the computer system/server 12.

Figure 2:
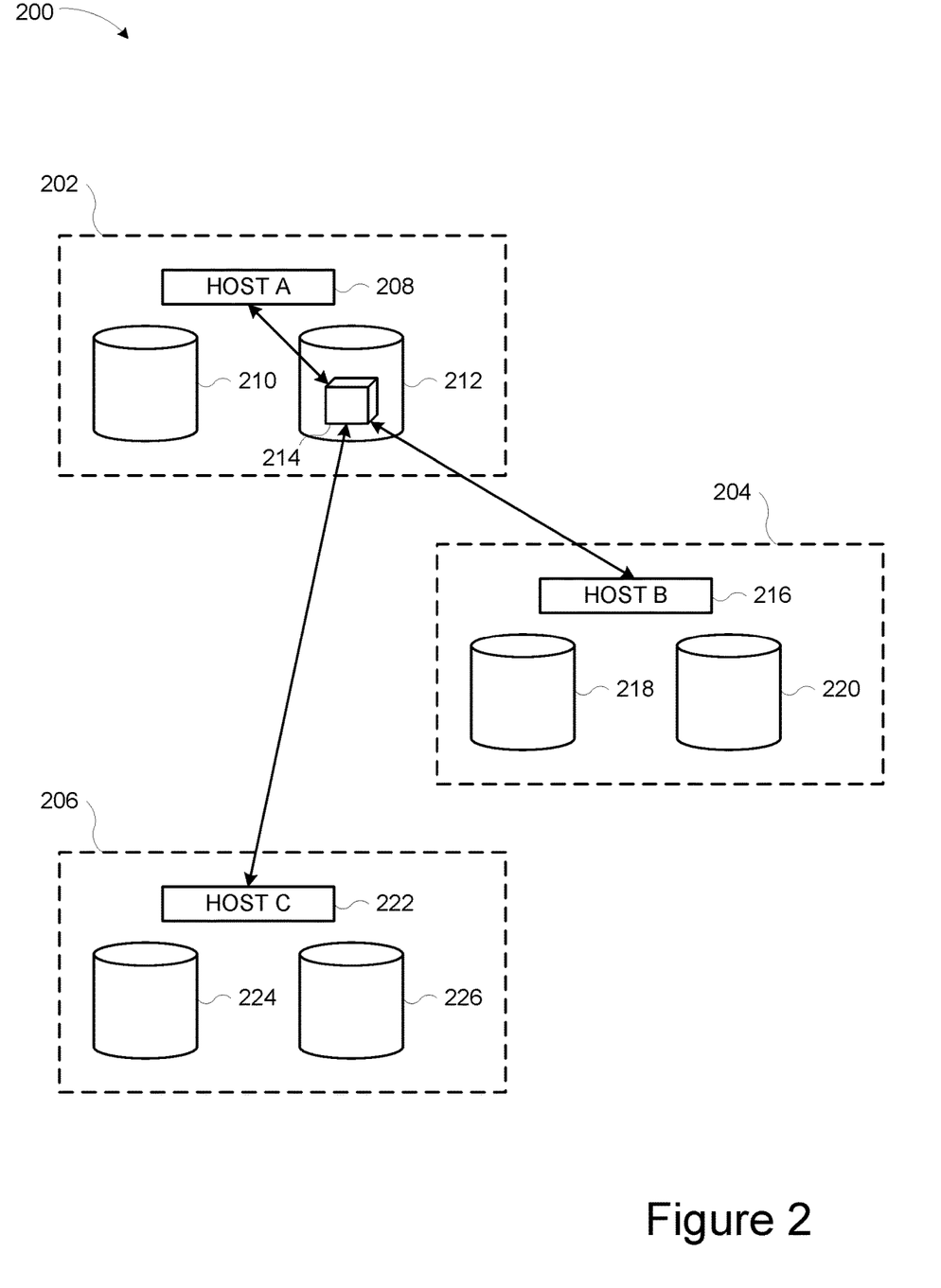
FIG. 2 is a block diagram illustrating one embodiment of a plurality of sites in a server storage area network in accordance with the present invention.

FIG. 2 is a block diagram illustrating one embodiment of a plurality of sites 202, 204, and 206 in a server storage area network 200 (server SAN) in accordance with the present invention. In some embodiments, the plurality of sites 202, 204, and 206 are asset storage sites. In the illustrated embodiment, the first site 202 includes a host 208, a first storage volume 210 and a second storage volume 212.

In some embodiments, host 208 (host A) includes one or more servers. For example, host A 208 may include one or more of a computer system/server 12 of FIG. 1 described above. In other embodiments, purpose-built, special purpose, general purpose, or multi-function servers or other systems are incorporated into host A 208. In some embodiments, host A 208 is geographically associated with or near the first storage volume 210 and the second storage volume 212. For example, host A 208 may be located within the same building or facility as the first and second storage volumes 210 and 212.

In other embodiments, host A 208 is located at a separate location from the first and second storage volumes 210 and 212. For example, host A 208 may be located at a central server location, away from the first and second storage volumes 210 and 212, but is associated with the first and second storage volumes 210 and 212 through assignment, network priority, connection/access speed, or other characteristics or specific associations.

In some embodiments, the first storage volume 210 includes at least a portion of one or more storage devices. In one embodiment, the first storage volume 210 includes at least a portion of a solid-state drive. In another embodiment, the first storage volume 210 includes at least a portion of one or more hard disk drives, solid-state drives, tape drives, or other permanent or rewritable storage devices.

In some embodiments, the first storage volume 210 makes up at least a portion of a first or higher performance storage location or tier while the second storage volume 212 makes up at least a portion of a second or lower performance storage location or tier. In some embodiments, the second storage volume 212 is a lower performance storage location in relation to the first storage volume 210 of the first site 202 or relative to other storage volumes on other sites. Similarly, in some embodiments, the first storage volume 210 is a higher performance storage location relative to the second storage volume 212 on the first site 202 or relative to other storage volumes on other sites.

In some embodiments, the performance of a storage volume (i.e. first storage volume 210 or second storage volume 212) is based on speed of reading and/or writing operations. In other embodiments, the performance is based upon cost to carry out the operation. In another embodiment, the performance of each storage volume is based upon one or more other qualities of the volume. For example, the first storage volume 210 may be one or more solid-state drives with relatively faster read/write speeds while the second storage volume 212 may be one or more hard disk drives with relatively slower read/write speeds. In another embodiment, the second storage volume 212 includes a solid-state drive that is slower than a solid-state drive of the first storage volume 210.

In the illustrated embodiment, an asset 214 is stored to the second storage volume 212. As described above, some embodiments of the second storage volume 212 include a hard disk drive or other type of storage device having a relatively lower performance. The asset 214 is accessed for operations by host A 208 of the first site 202, host B 216 of the second site 204, and host C 222 of the third site 206. In some embodiments, the operations include reading and writing operations. Other embodiments include other operations requested or executed with respect to the asset 214.

In some embodiments, the asset 214 is the target of read, write, or other requests from host B 216 and host C 222 because no available copies of the asset exist on the second site 204 and the third site 206 or because asset 214 on the second storage volume 212 is the only instance of the asset 214 that is available or has associated permissions for the operation (open for writing, reading, etc.).

In some embodiments, more traffic associated with the asset 214 comes from one host than comes from another. If that high traffic host is not the local host (host A 208 for asset 214 in the illustrated embodiment) but is a remote host, facilitating the remote traffic may result in a penalty or resource cost to the network 200 that may be higher than is acceptable. Identifying high cost traffic situations such as this can enable solutions described below to reduce the costs for the network 200. As described below with reference to FIG. 3, in some embodiments, the traffic at the asset is tracked to manage a storage location of the asset 214 to reduce the penalty or cost to the network 200.

Figure 3:
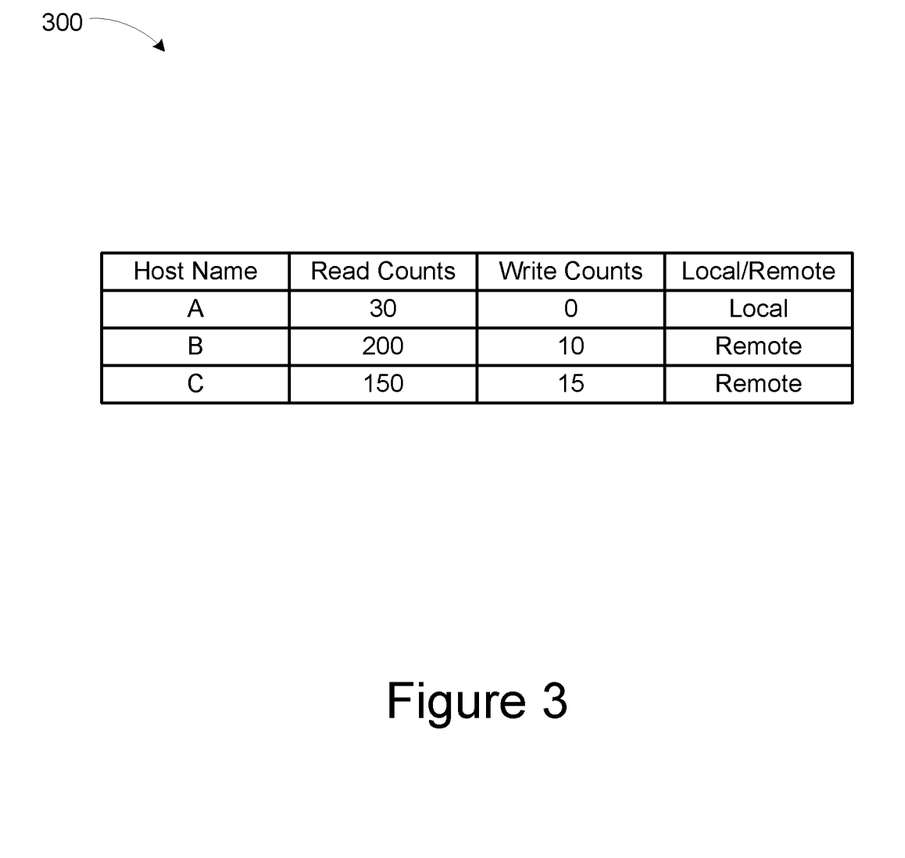
FIG. 3 is a table illustrating one embodiment of an input/output (I/O) record in accordance with the present invention.

FIG. 3 is a table illustrating one embodiment of an input/output (I/O) record 300 in accordance with the present invention. In the illustrated embodiment, the traffic for the asset is separated by each accessing host and includes separate counts for read operations and write operations from the corresponding host. Additionally, the illustrated embodiment of the record 300 includes information describing the relationship (local/remote) of each host relative to the asset.

Correlating the information in the record 300 to the network 200 illustrated in FIG. 2, it can be seen that host A 208 is local to the asset 214 (on the same site 202). In the record 300, host A 208 has thirty read counts and zero write counts for the asset 214.

In the illustrated embodiment of FIG. 2, host B 216 is located at the second site 204 for which the embodiment of FIG. 3 lists host B 216 as remote to the asset 214. In the illustrated embodiment of the record 300, host B 216 has two-hundred reads and ten writes recorded. Host C 222 is located at the third site 206 which is also remote to the asset 214 which is stored at the first site 202. The illustrated embodiment of the record 300 indicates that host C 222 has one-hundred fifty read operations counted and fifteen write operations.

In one embodiment, the record 300 is generated by a load calculator (described in greater detail below with reference to FIG. 7). In some embodiments, the load calculator generates the record 300 and operates on one or more servers, systems, or devices of a host local to the storage location of the asset. Regarding FIG. 2, in one embodiment, the record 300 is generated by one or more servers or devices of the host A 208 as the host A 208 is local to the present storage location (second storage volume 212) of the asset 214. In other embodiments, the record 300 is generated by a resource located outside of the host A 208 or across multiple resources on the host A 208 and/or other hosts or locations. For example, the record 300 may be generated by a central recording system. Other embodiments include other recording systems and arrangements.

In some embodiments, a threshold is established based on the several values included in the record 300. In some embodiments, the threshold is generated based on the values of multiple records for multiple assets.

In some embodiments, the threshold includes separate read and write thresholds. Some embodiments of the threshold establish acceptable upper limits for read operations and write operations. In some embodiments, the thresholds are specific to a particular asset. In other embodiments, the thresholds are applied to more than one asset across one or more storage locations.

While embodiments discussed herein relate to upper limits for traffic at an asset (hot asset), other embodiments also handle management of assets with traffic falling below a lower threshold (cold assets) to more efficiently allocate network resources.

For example, the read threshold for the asset 214 may be set at one-hundred while the write threshold is set at fifty. As such, in the illustrated embodiment of the record 300, both the remote hosts, host B 216 and host C 222, exceed the read threshold of one-hundred while the local host, host A 208, does not. None of the hosts exceeds the write threshold of fifty.

In some embodiments, in response to a determination that the read operations have reached or exceeded the read threshold, a request for promotion or copy of the asset 214 occurs. If the request is approved, the promotion or copy is completed.

In the illustrated embodiment of the record 300, both host B 216 and host C 222 have exceeded the read threshold. In some embodiments, because it is the read threshold that has been exceeded and not the write threshold, a copy request is generated. In some embodiments, a remote host penalty is applied which provides a preference to local hosts over remote hosts to account for the network resource cost of moving the asset 214 from the current host to a remote host.

Figure 4:
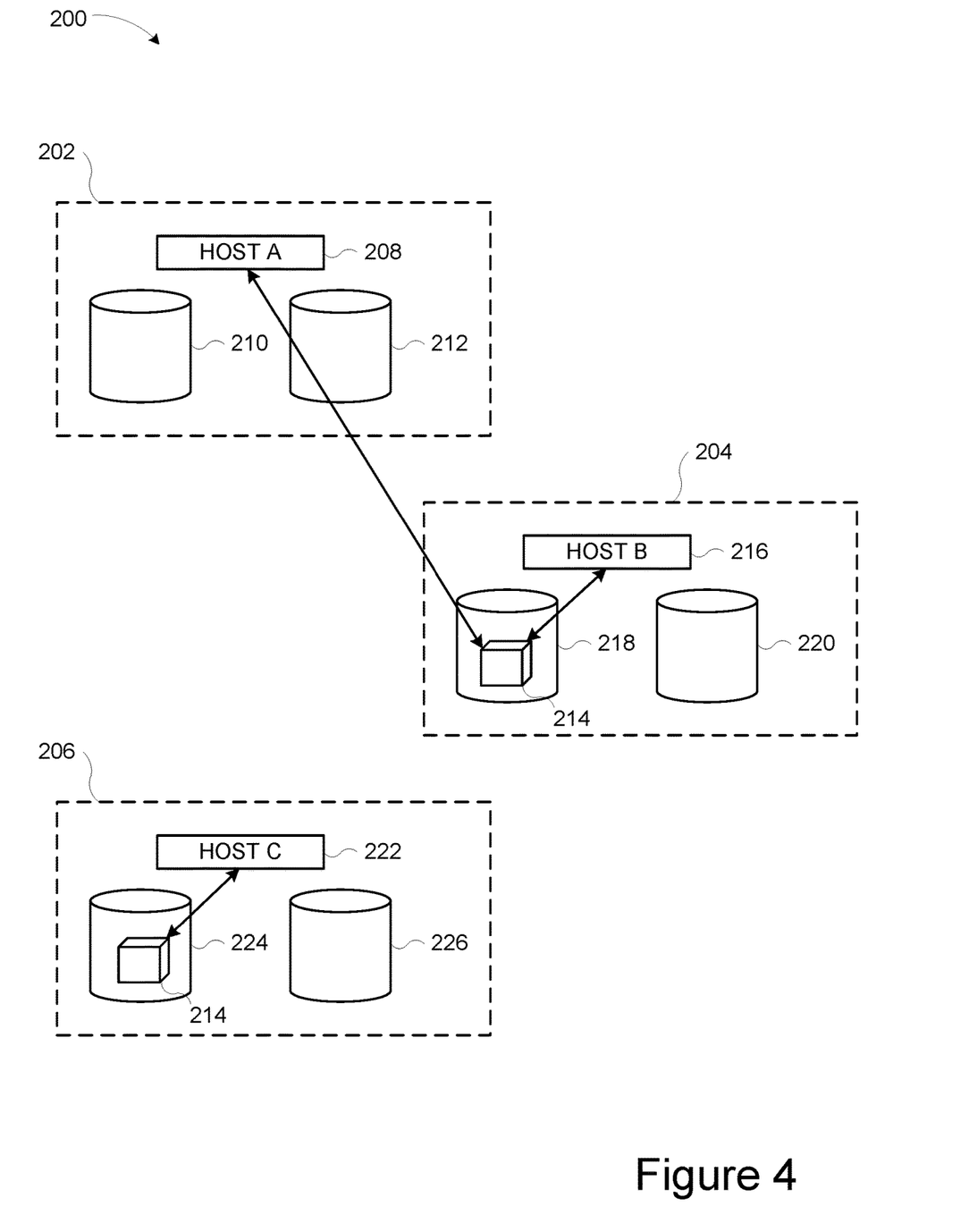
FIG. 4 is a block diagram illustrating another embodiment of plurality of sites in a server storage area network in accordance with the present invention.

In the illustrated embodiment, upon approval (discussed in more detail below in relation to FIG. 7), the asset 214 is copied from the second storage volume 212 of the first site 202. As shown in FIG. 4, the asset 214 is copied from the second storage volume 212 of the first site 202 to the higher performance storage volume 218 of the second site 204 and the higher performance storage volume 224 of the third site 206.

FIG. 4 is a block diagram illustrating another embodiment of plurality of sites 202, 204, and 206 in a server storage area network in accordance with the present invention. In some embodiments, the original copy of the asset 214 on the second storage volume 212 of the first site 202 is then removed.

In some embodiments, if the host A 208 of the first site 202 has a sufficient read operation count, the copy on the first site 202 is left in place and other copies are made at the other sites 204 and 206 or the copy on the first site 202 is promoted to the first storage volume 210 and other copies are made at the higher or lower performance storage location of the other sites 204 and 206. Other situations and copy/promotion arrangements are contemplated.

In the illustrated embodiment, the thirty read operations of host A 208 of the first site on the asset 214, as shown on the record 300 of FIG. 3, is not sufficient to justify keeping a copy of the asset 214 on the first site 202. Subsequently, further operations by host A 208, after the copy request is completed, are directed to the copy of the asset 214 residing on the higher performance storage volume 214 of the second site 204. In other embodiments, the operations by host A 208 are directed to the copy of the asset 214 on the third site 206.

In some embodiments, subsequent operations by host A 208 on the asset 214 are randomly or alternatingly directed to both the copy of the asset 214 at the second site 204 and the copy of the asset 214 at the third site 206. In other embodiments, the operations from host A 208 are directed to either the second site 204 or the third site 206 based on current network traffic and/or resource availability. Some embodiments provide other access patterns or rules to allow the host A 208 to access the asset 214.

In the illustrated embodiment, host B 216 and host C 222 both have access to corresponding local copies of the asset 214. In some embodiments, this reduces network traffic, improves the time required to carry out the operations, or improves other aspects of network efficiency.

In the illustrated embodiment of FIG. 4, the copies of the asset 214 have been stored to the second site 204 and the third site 206 at the corresponding higher performance storage volumes 218 and 224. In some embodiments, the asset 214 is stored to the higher performance storage locations in response to the read operations exceeding the threshold by a certain percentage, number, or other metric. In other embodiments, the asset 214 is stored to the higher performance storage locations in response to the read operations exceeding the threshold within a timeframe or at a certain rate.

In some embodiments, the asset 214 is stored to the higher performance storage locations in response to a trend in the number of operations corresponding to the asset 214. For example, the trend may predict that the number of operations on the asset 214 will continue to increase and the move to the higher performance storage locations provides an advantage to the network over the lower performance storage locations based on the predicted number of operations.

In some embodiments, the asset 214 is stored to the higher performance storage volume 218 of the second site 204 and the lower performance storage volume 226 of the third site 206. Other storage arrangements may be selected based on the number of operations from each host or site, the performance metrics of each storage volume at each site, or other variables or characteristics.

Figure 5:
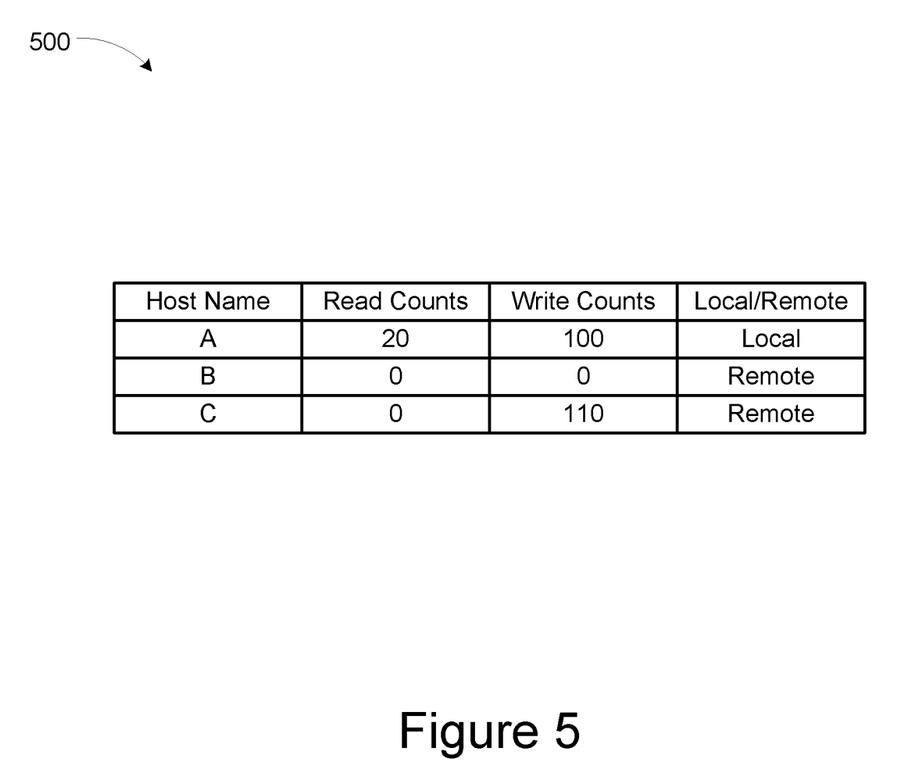
FIG. 5 is a table illustrating another embodiment of an I/O record in accordance with the present invention.

FIG. 5 is a table illustrating another embodiment of an I/O record 500 in accordance with the present invention. In the illustrated embodiments and following description of FIGS. 5 and 6, assume that the read threshold is one-hundred reads and the write threshold is fifty writes. In the illustrated embodiment, the read counts of the hosts 208, 216, and 222 do not pass the read threshold but the write count of host A 208 and the write count of host C 206 both exceed the write threshold of fifty write operations. The illustrated embodiment of FIG. 5 is further related and described in conjunction with FIG. 6.

Figure 6:
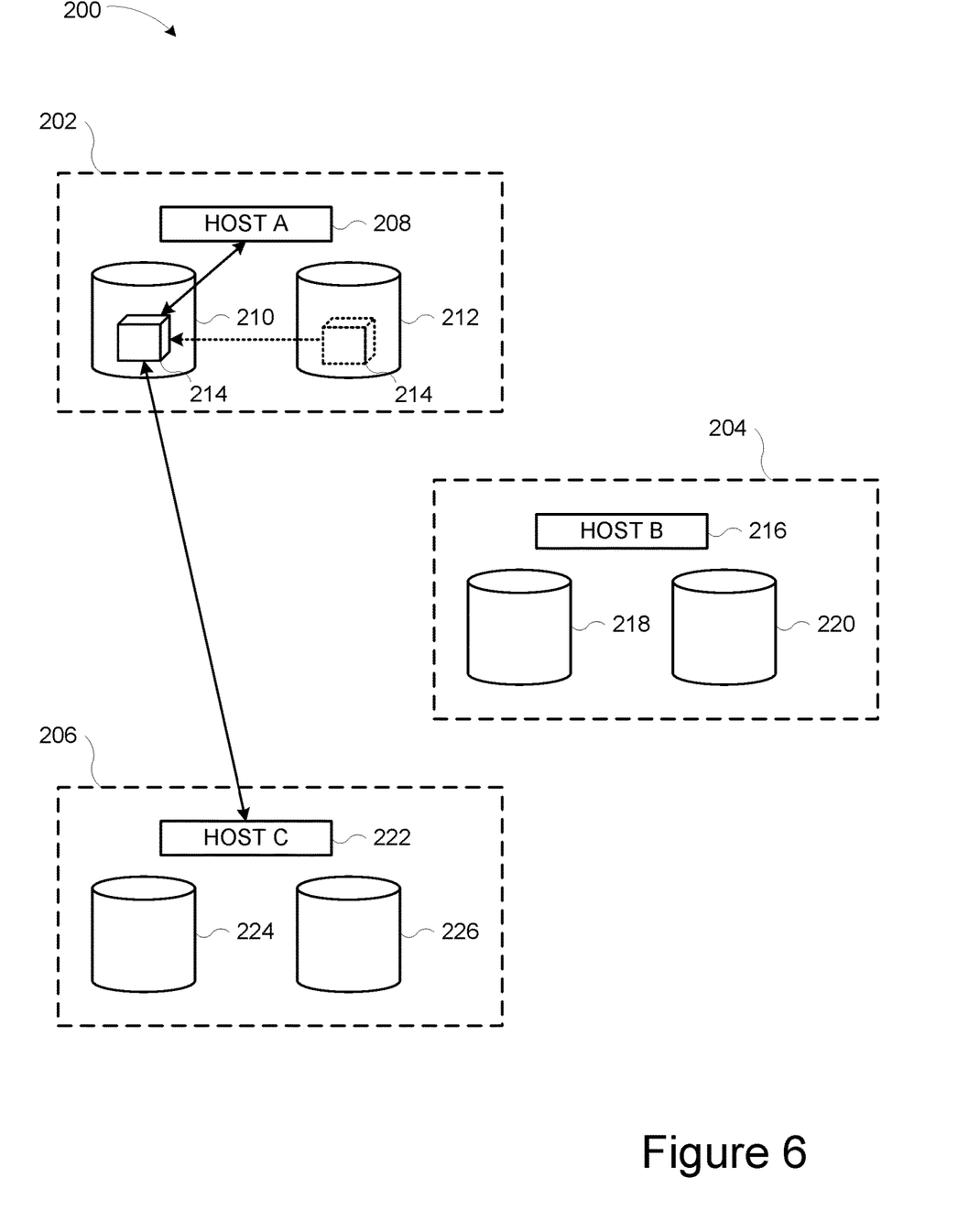
FIG. 6 is a block diagram illustrating another embodiment of a plurality of sites in a server storage area network in accordance with the present invention.

FIG. 6 is a block diagram illustrating another embodiment of a plurality of sites 202, 204, and 206 in a server storage area network 200 in accordance with the present invention. In the illustrated embodiment, while the number of operations for the asset 214 from host C 222 is higher (one-hundred ten) than the number of operation for the asset 214 from host A 208 (one-hundred), with a network penalty applied, host A is the preferred host because host A 208 is local to the previous storage location of the asset 214 (shown and described in FIG. 2) and host C 222 is a remote host.

In some embodiments, the network penalty (or remote host penalty) is a percentage penalty applied to the operation counts. For example, the network penalty may be a 15% penalty. A 15% penalty to the count for host C 222 on the record 500 may result in a penalized count of 93.5 which is less than the count for host A 208. In other embodiments, different penalty types or manners of applying different penalties are incorporated.

In some embodiments, the penalty is applied before determining if the number of operations exceeds the corresponding threshold. In other embodiments, the penalty is applied in situations in which both local and remote hosts are determined to have exceeded the threshold. In other words, some embodiments apply the network penalty as a conflict resolution, tie-breaker, or ranking criterion after the hosts have been determined to have exceeded the threshold.

In the illustrated embodiment, a promotion request is generated in response to a determination that one or more hosts have exceeded the write threshold. In some embodiments, upon approval of the promotion request, the asset 214 is copied from the lower performance second storage volume 212 to the higher performance first storage volume 210 and the copy at the second storage volume 212 is deleted. In some embodiments, the associated mapping for the asset is updated. In some embodiments, only one copy of the asset is maintained to preserve data continuity during the frequent write operations.

In some embodiments, if both the read operations count and the write operations count exceed the corresponding thresholds, a promotion request is generated to avoid data consistency issues. Other embodiments include other strategies for handling read counts and write counts that exceed the corresponding thresholds.

As described above, some embodiments of the first storage volume 210 include a solid-state drive having read and/or write times faster than that of the second storage volume 212 which includes a hard disk drive or other device which has a performance aspect lesser than that of the first storage volume 210. In other embodiments, the first storage volume 210 includes any drive or storage device or volume having a read or write time faster than that of the second storage volume 212.

In some embodiments, after the promotion of the asset 214 from the second storage volume 212 to the first storage volume 210, further read operations for the asset 214 are directed, by the corresponding host to the asset 214 at the new location. In some embodiments, further write operations are saved to the site corresponding to the accessing host and other copies on the same site are deleted to preserve data consistency at the site. In other embodiments, further write operations are saved to the site corresponding to the accessing host and all other copies at the same and other sites are deleted to preserve data consistency across the network.

In some embodiments, previous versions or copies of the asset 214 are deleted and the mapping updated while in other embodiments, previous versions of the asset 214 are listed as available for overwrite or rewrite and the mapping associated with the asset 214 is updated to the new storage location.

Figure 7:
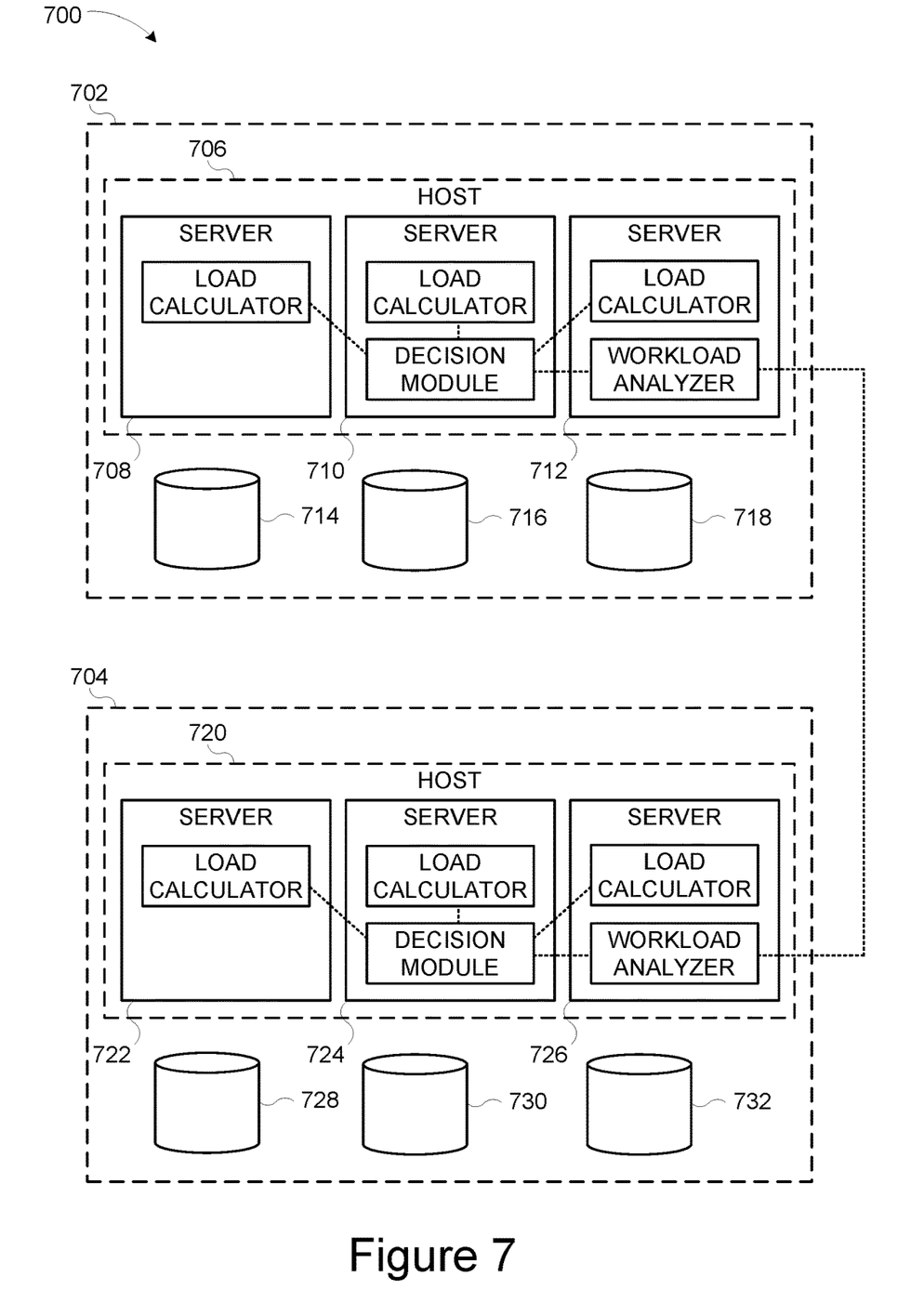
FIG. 7 is a block diagram illustrating another embodiment of a plurality of sites in a server storage area network in accordance with the present invention.

FIG. 7 is a block diagram illustrating another embodiment of a plurality of sites 702 and 704 in a server storage area network 700 in accordance with the present invention. The illustrated embodiment includes a first site 702 and a second site 704. The first site 702 includes a first host 706 and the second site 74 includes a second host 720. In the illustrated embodiment, the first host 706 includes a first server 708, a second server 710, and a third server 712. Similarly, the illustrated embodiment of the second host 720 includes fourth, fifth, and sixth servers 722, 724, and 726, respectively. In some embodiments, the first host 706 or second host 720 includes fewer or more servers, systems, or devices.

The first site 702 also includes a first storage volume 714, a second storage volume 716, and a third storage volume 718. The first, second, and third storage volumes 714, 716, and 718 are accessed by the servers 708, 710, and 712.

In the illustrated embodiment, each of the first, second, and third servers 708, 710, and 712 includes a load calculator. In one embodiment, the load calculator operates as a unity across the servers 708, 710, and 712 of the first site 701. In some embodiments, the load calculator tracks the number of operations for an asset stored one or more of the storage volumes 714, 716, and 718 of the first site 702.

In the illustrated embodiment, the load calculator of each site communicates with the decision module of the site and the workload analyzer communicates across multiple sites 702 and 704. In other embodiments, more or fewer communication connections exist between the components at each site 702 and 704.

In some embodiments, the load calculator generates an input/output (I/O) record (such as those shown and described in FIGS. 3 and 5) of the operations corresponding to each asset tracked on the first site 702. In some embodiments, the record generated by the load calculator is shared by or stored to each of the servers 708, 710, and 712 of the first site 702.

In the illustrated embodiment, the third server 712 includes a workload analyzer. In some embodiments, the workload analyzer operates on multiple sites 702 and 704 as a unity. For example, the workload analyzer may be a cluster distributed across the first and second sites 702 and 704. In some embodiments, the workload analyzer collects the record of input/output operations for each asset on each site and determines a threshold for each operation. In some embodiments, the thresholds include a write threshold and a read threshold for assets on the multiple sites 702 and 704.

In the illustrated embodiment, the second server 710 includes a decision module. In some embodiments, the decision module analyses the record generated by the load calculator for each asset and determines whether the record for an asset has exceeded the threshold set by the workload analyzer. In some embodiments, in response to a determination that an operation has reached a corresponding threshold, the decision module sends a request to the workload analyzer requesting a promotion or copy of the asset.

In some embodiments, the workload analyzer reconciles the request from the decision module on the first site 702 with one or more requests from the decision module of the second site 704. In some embodiments, the workload analyzer resolves conflicts in the requests. In other embodiments, the workload analyzer determines priority among the requests received from the corresponding decision modules of the sites 702 and 704.

In some embodiments, the workload analyzer determines if a potential storage location for the asset has sufficient storage space or processing capacity to fulfill the request. In other embodiments, the workload analyzer resolves a conflict by applying a network penalty (as described above) to a promotion or copy request.

In some embodiments, in response to receipt of an approval sent from the workload analyzer to the decision module corresponding to the request, the decision module executes the requested promotion and/or copy. In some embodiments, the decision module updates mapping information corresponding to the affected asset after the promotion or copy is completed. In some embodiments, the decision module also deletes a previous version of the asset upon completion of the promotion or copy.

In some embodiments, the requested copy includes copying the asset to another storage location corresponding to another server or site in response to a read count on the record exceeding the threshold set by the workload analyzer. In some embodiments, the requested promotion includes promoting the asset from a lower performance storage volume (such as the third storage volume 718) to a higher performance storage volume (such as the second or first storage volumes 716 or 714) in response to a determination that the write threshold set by the workload analyzer or both the write threshold and the read threshold set by the workload analyzer has been exceeded for the asset.

In some embodiments, the asset is copied from a lower performance storage location on the first site 702 to a higher performance storage location on the second site 704 which may be identified as both a copy and a promotion of the asset. In some embodiments, the above copy and promotion is executed as separate processes. For example, the asset may be copied from the lower performance storage volume of the first site 702 to a lower performance storage volume of the second site 704 and then separately promoted from the lower performance storage location of the second site 704 to a higher performance storage location on the second site 704. Other manners of completing a corresponding request are contemplated.

Figure 8:
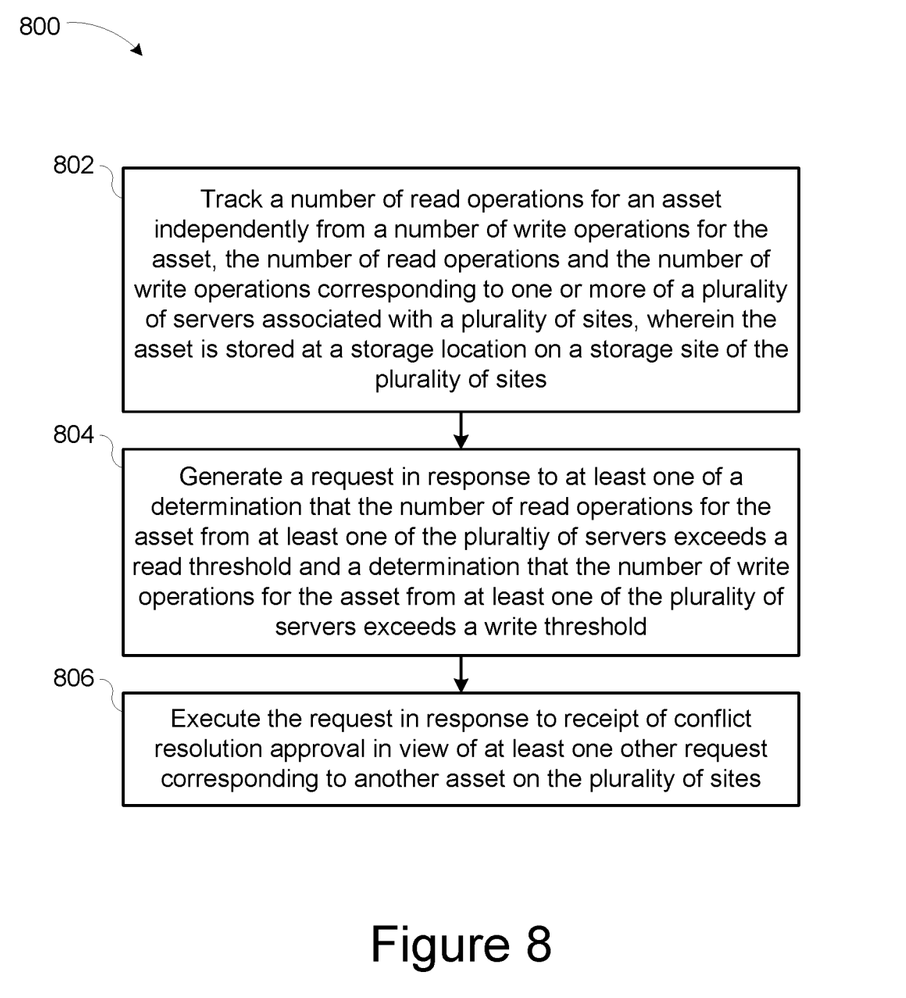
FIG. 8 is a schematic flow chart diagram illustrating one embodiment of a method in accordance with the present invention.

FIG. 8 is a schematic flow chart diagram illustrating one embodiment of a method 800 in accordance with the present invention. The method 800 includes, at block 802, tracking read operations and write operations for an asset. In some embodiments, the number of read operations is tracked independently from a number of write operations for the asset. In some embodiments, the number of read operations and the number of write operations correspond to one or more of a plurality of servers associated with a plurality of sites. The asset may be stored at a storage location on a storage site of the plurality of sites.

In some embodiments, the number of read and write operations for an asset are tracked independently to provide an appropriate response to the number of read and write operations as different solutions (copy, promote, etc.) may be better for situations of high read counts for an asset while others are better for situations of high write counts for an asset. In some embodiments, the numbers of read and write operations are tracked based on the server performing the various operations, while other embodiments are tracked based on the site performing the various operations.

In some embodiments, the record tracks operations corresponding to multiple copies of the same asset stored at different locations. In other embodiments, the record tracks operations corresponding to a single instance of the asset.

At block 804, the method 800 includes generating a request in response to the operations exceeding a corresponding threshold. In some embodiments, the request is in response to at least one of a determination that the number of read operations for the asset from at least one of the plurality of servers exceeds a read threshold and a determination that the number of write operation for the asset from at least one of the plurality of servers exceeds a write threshold.

In some embodiments, the request generated in response to a determination that the read operations for the asset exceeds the read threshold includes a request to copy the asset. In other embodiments, the request generated in response to the determination that the read operations for the asset exceeds the read threshold includes a request to promote the asset to a higher performance tier storage volume or device. In other embodiments, the request includes a request to copy and a request to promote. In some embodiments, the request includes a request to make multiple copies of the asset and promote at least one of the resulting instances of the asset.

At block 806, the method 800 includes executing the request. In some embodiments, executing the request is completed in response to receipt of conflict resolution approval in view of at least one other request corresponding to another asset on the plurality of sites. In some embodiments, multiple requests are received which may involve the same server, asset, storage volume, or site. In some embodiments, one or more of the multiple requests may conflict with another of the multiple requests.

In some embodiments, the conflict resolution approval is reached by prioritizing the multiple requests. In other embodiments, the conflict resolution approval is reached by determining an effect on the resources of the plurality of sites. In some embodiments, the conflict resolution approval is reached by forecasting network traffic or loads from current or historical trends. Other factors or criteria may be applied in resolving conflicts between requests.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A network asset management system, comprising:
   a processor configured to execute program instructions, the program instructions organized into modules comprising:
   a load calculator that generates an input/output (TO) record for an asset, the IO record comprising a count of read operations and write operations corresponding to the asset from each of a plurality of sites;
   a workload analyzer that collects the IO record and generates at least one of a write threshold and a read threshold; and
   a decision module that:
      generates a request for promotion of the asset from a current storage location to a new storage location in response to a determination that a write operation has reached the write threshold,
      generates a request for copy of the asset at the new storage location in response to a determination that a read operation has reached the read threshold for the asset, and
      executes at least one of the request for promotion and the request for copy on the asset, wherein:
the request for promotion is different from the request for copy, and
in response to a determination that the number of read operations exceeds the corresponding threshold and the number of write operations exceeds the corresponding threshold, the processor is configured to:
copy the asset to a new asset storage site of the plurality of sites having a number of write operations that exceeds the write threshold in response to a determination that the current asset storage site does not exceed the corresponding threshold,
promote the asset to a higher performance storage location within a current asset storage site in response to a determination that the number of write operations for the current asset storage site exceeds the corresponding threshold and is higher than the number of write operations for the new asset storage site which also exceeds the corresponding threshold with a network penalty applied, and
copy the asset to the new asset storage site whose number of write operations exceeds the corresponding threshold in response to a determination that the number of write operations for the current asset storage site exceeds the corresponding threshold but is less than the number of write operations for the new asset storage site with a network penalty applied.

2. The system of claim 1, wherein the workload analyzer further resolves a conflict created by the request by determining whether a potential storage location identified by the request has sufficient storage space to fulfill the request.

3. The system of claim 1, wherein the workload analyzer resolves a conflict created by the request by determining whether a potential storage location identified by the request has sufficient input/output capacity to fulfill the request.

4. The system of claim 1, wherein the workload analyzer comprises a cluster distributed across the plurality of sites.

5. The system of claim 1, wherein the decision module performs the copy in addition to the promotion of the asset in response to a determination that the read threshold has been exceeded.

6. The system of claim 1, wherein the decision module further updates an asset mapping in response to performance of the at least one of the promotion and copy.

7. The system of claim 1, wherein the decision module further deletes a previous version of the asset in response to performance of the at least one of the promotion and copy.

8. The system of claim 1, wherein the IO record comprises statistics corresponding to read and write requests from one or more servers associated with one or more of the plurality of sites.

9. A method, comprising:
tracking a number of read operations for an asset independently from a number of write operations for the asset, the read operations and write operations for the asset originating from each of a plurality of sites;
determining that at least one of the number of read operations and the number of write operations tracked for the asset from at least one of the plurality of sites exceeds a corresponding threshold;
generating a request for promotion of the asset from a current storage location to a new storage location in response to the determination that a write operation has reached the write threshold;
generating a request for copy of the asset at the new storage location in response to a determination that a read operation has reached the read threshold for the asset; and
executing at least one of the request for promotion and the request for copy on the asset,
wherein:
the request for promotion is different from the request for copy, and
in response to a determination that the number of read operations exceeds the corresponding threshold and the number of write operations exceeds the corresponding threshold, generating requests to:
copy the asset to a new asset storage site of the plurality of sites having a number of write operations that exceeds the write threshold in response to a determination that the current asset storage site does not exceed the corresponding threshold,
promote the asset to a higher performance storage location within a current asset storage site in response to a determination that the number of write operations for the current asset storage site exceeds the corresponding threshold and is higher than the number of write operations for the new asset storage site which also exceeds the corresponding threshold with a network penalty applied, and
copy the asset to the new asset storage site whose number of write operations exceeds the corresponding threshold in response to a determination that the number of write operations for the current asset storage site exceeds the corresponding threshold but is less than the number of write operations for the new asset storage site with a network penalty applied.

10. The method of claim 9, further comprising resolving a conflict associated with the request by determining a higher priority ranking of the request relative to at least one other request corresponding to another asset.

11. The method of claim 10, wherein resolving the conflict relates to a capacity of a potential copy storage location or promotion storage location.

12. The method of claim 10, wherein a network penalty is applied to account for a characteristic of a potential copy storage location or promotion storage location for at least one of the asset and other asset in the comparison.

13. The method of claim 9, wherein the request for copy comprises a request to copy the asset to more than one of the plurality of sites having a number of tracked read operations for the asset that exceeds the corresponding threshold.

14. The method of claim 13, wherein the request for copy of the asset further comprises a request to promote the asset within a current asset storage site of the asset from a lower performance storage location to a higher performance storage location in response to a determination that the higher performance storage location of the current asset storage site can accommodate the asset and the current asset storage site has a number of read operations for the asset that exceeds the corresponding threshold, the request to promote comprising a request to copy the asset to the higher performance storage location and delete the asset from the lower performance storage location.

15. The method of claim 9, wherein the request for promotion of the asset comprises a request to promote the asset from a lower performance storage location of a current asset storage site of the plurality of sites to a higher performance storage location of the current asset storage site and delete the asset from the lower performance storage location.

16. The method of claim 9, wherein the request for promotion of the asset from a current asset storage site of the asset in the plurality of sites to a new asset storage site of the plurality of sites in response to a determination that the new asset storage site has a number of write operations for the asset that exceeds the corresponding threshold, the request to promote comprising a further request to copy the asset to the new asset storage site and delete the asset from the current asset storage site.

17. A computer program product for providing network asset management, the computer program product comprising a computer readable storage medium having program instructions embodied therewith, the program instructions readable/executable by a processor to cause the processor to:
  track, by the processor, a number of read operations for an asset independently from a number of write operations for the asset, the read operations and write operations for the asset originating from each of a plurality of sites;
  determine, by the processor, that at least one of the number of read operations and the number of write operations tracked for the asset from at least one of the plurality of sites exceeds a corresponding threshold;
  generate, by the processor, a request for promotion of the asset from a current storage location to a new storage location in response to a determination that a write operation has reached the write threshold;
  generate, by the processor, a request for copy of the asset at the new storage location in response to a determination that a read operation has reached the read threshold for the asset; and
  execute, by the processor, at least one of the request for promotion and the request for copy on the asset,
  wherein:
    the request for promotion is different from the request for copy, and
    in response to a determination that the number of read operations exceeds the corresponding threshold and the number of write operations exceeds the corresponding threshold, generating requests to:
      copy the asset to a new asset storage site of the plurality of sites having a number of write operations that exceeds the write threshold in response to a determination that the current asset storage site does not exceed the corresponding threshold,
      promote the asset to a higher performance storage location within a current asset storage site in response to a determination that the number of write operations for the current asset storage site exceeds the corresponding threshold and is higher than the number of write operations for the new asset storage site which also exceeds the corresponding threshold with a network penalty applied, and
      copy the asset to the new asset storage site whose number of write operations exceeds the corresponding threshold in response to a determination that the number of write operations for the current asset storage site exceeds the corresponding threshold but is less than the number of write operations for the new asset storage site with a network penalty applied.

18. The computer program product of claim 17, wherein the request for copy comprises a request to copy the asset to more than one of the plurality of sites having a number of tracked read operations for the asset that exceeds the corresponding threshold.

19. The computer program product of claim 17, wherein the request for promotion comprises a request to promote the asset from the current asset storage site of the asset in the plurality of sites to the new asset storage site of the plurality of sites in response to a determination that the new asset storage site has a number of write operations for the asset that exceeds the corresponding threshold, the request to promote further comprising a request to copy the asset to the new asset storage site and delete the asset from the current asset storage site.

20. The computer program product of claim 17, wherein the request for promotion of the asset comprises a request to promote the asset from a lower performance storage location of a current asset storage site of the plurality of sites to a higher performance storage location of the current asset storage site and delete the asset from the lower performance storage location.

* * * * *